United States Patent [19]
Resch et al.

[11] Patent Number: 5,501,514
[45] Date of Patent: Mar. 26, 1996

[54] HYDRAULIC BRAKE DEVICE HAVING AN ANTI-SKID SYSTEM

[75] Inventors: Reinhard Resch, Stuttgart; Anton van Zanten, Ditzingen-Schöckingen; Rainer Lauer, (deceased), late of Münchingen; Regina Schroff-Lauer, heiress; Joscha Lauer, heir; Rainer Altmann, Erligheim; Jürgen Binder, Schwieberdingen; Michael-Raymond Meyer, Ludwigsburg, all of Germany

[73] Assignees: Robert Bosch GmbH, Germany; Mercedes Benz AG, both of Stuttgart; a part interest

[21] Appl. No.: 244,495

[22] PCT Filed: Sep. 4, 1993

[86] PCT No.: PCT/DE93/00802

§ 371 Date: Aug. 19, 1994

§ 102(e) Date: Aug. 19, 1994

[87] PCT Pub. No.: WO94/07720

PCT Pub. Date: Apr. 14, 1994

[30] Foreign Application Priority Data

Sep. 26, 1992 [DE] Germany ............................ 42 32 311.8

[51] Int. Cl.⁶ ............................... B60T 8/48; B60T 8/24; B60T 7/12
[52] U.S. Cl. .................... 303/115.4; 303/DIG. 2
[58] Field of Search ............................. 303/10, 11, 113.1, 303/113.2, 115.4, 115.5, 116.1, 116.2, DIG. 1–DIG. 4

[56] References Cited

U.S. PATENT DOCUMENTS

| | | | |
|---|---|---|---|
| 4,700,991 | 10/1987 | Nishimura et al. | 303/115.4 |
| 5,015,043 | 5/1991 | Resch | 303/DIG. 3 |
| 5,205,623 | 4/1993 | Holzmann et al. | 303/113.2 |
| 5,246,280 | 9/1993 | Sigl | 303/113.2 |
| 5,388,898 | 2/1995 | Reinartz et al. | 303/DIG. 2 X |
| 5,401,083 | 3/1995 | Altmann et al. | 303/113.2 |

FOREIGN PATENT DOCUMENTS

4213710 10/1993 Germany ............................ 303/116.2

Primary Examiner—Josie Ballato
Attorney, Agent, or Firm—Edwin E. Greigg; Ronald E. Greigg

[57] ABSTRACT

A vehicle hydraulic brake system having an anti-lock protection device and an automatic braking system, particularly when driving around bends. During automatic braking, an auxiliary pressure source supplies a pressure instead of the main brake cylinder and this pressure can be individually set by pressure reduction in the wheel brakes by means of the anti-lock protection device. For this purpose, cylinders with separating pistons are located between the auxiliary pressure source and the anti-lock protection device. The auxiliary pressure source supplies substantially lower auxiliary pressures than known systems by supplying pressure to the inlets of feed-back pumps by arranging valves which permit temporary pressure increases to the extent necessary for automatic braking by means of these feed-back pumps. The system requires less energy and less noise is caused in automatic braking operations.

20 Claims, 7 Drawing Sheets

HYDRAULIC BRAKE DEVICE HAVING AN ANTI-SKID SYSTEM

PRIOR ART

The invention is based on a hydraulic brake system as set forth here in after.

A vehicle hydraulic brake system with an anti-lock protection device and a control unit is known from the U.S. Pat. No. 4,809,183. In addition, a hydraulic pressure source and at least one analysis circuit is associated with the anti-lock protection device for recognizing oversteer tendency, understeer tendency and incipient danger of skidding and for generating control signals for the anti-lock protection device so that the latter automatically brakes the vehicle, using the hydraulic pressure source, whereby, from case to case, the wheels of one vehicle axle or all the vehicle axles are braked. The automatic braking stabilizes the vehicle and therefore acts against an oversteer tendency or understeer tendency or a danger of skidding or skidding which has already appeared. The pressure source is not represented. Skew running angles, for example, are measured to obtain the control signals and are compared with preselected threshold values. The rotational velocity of the vehicle about the vertical axis can also be observed, for example, by means of a gyroscope. Alternatively, transverse accelerations can also be measured by means of acceleration sensors associated with the axles and can be analysed.

From the publication WO 90/02064, it is known to use an anti-lock protection device with 3/3-way valves for anti-lock protection operation and, in the case of vehicle stabilization becoming necessary for the purpose of compensating for skidding or the danger of skidding, to separate the front wheel brakes from a main pressure cylinder and to automatically brake the front wheels strongly, in particular to lock them, using a pressure source and the 3/3-way valves associated with the front wheels. The publication provides three solution possibilities for obtaining control signals for the stabilization case in order to control the 3/3-way valves in brake pressure build-up positions, so that stronger braking pressure or even locking pressure is supplied to the front wheel brakes The pressure source is not represented. Means which prevent an undesired draining of pressure medium to the main brake cylinder in stabilization operation are likewise not represented.

The publication DE 41 09 925 A1 reveals a hydraulic brake system with advantageous closed brake circuits and with an anti-lock protection device operating on the so-called feed-back principle and, for controlling the driving behaviour of a vehicle in a bend, a combination installed per brake circuit, between the said anti-lock protection device and a main brake cylinder, of a controllable 2/2-way valve and a cylinder with a separating piston and a separating piston return spring and, for both brake circuits, a common auxiliary pump and a 3/2-way valve downstream of the latter for controlled action on the separating piston and for controlling the 2/2-way valves, which are hydraulically controllable by control inputs for closing brake conduits between the cylinders and the main brake cylinder. After the main brake conduits have been shut off, pressures generated in the cylinders are modulated by means of the anti-lock protection device and are individually supplied to the wheel brakes of the four wheels. The anti-lock protection device can also reduce the pressures supplied to the wheel brakes individually. A control unit which controls both the 3/2-way valve and the anti-lock protection device in order to improve the driving behaviour in a bend of the motor vehicle equipped with it, can also switch on a drive motor for the auxiliary pump. A disadvantage is that, because of the hydraulic circuitry between the cylinders and the modulation valve arrangements of the anti-lock protection device, the auxiliary pump has to supply a pressure up to the level of the maximum braking pressure to be expected when driving around a bend. The auxiliary pump has to be correspondingly powerfully configured and the necessary drive motor is heavy and loads an electrical on-board network of the vehicle in a disadvantageous manner. The heavy drive motor and the heavy auxiliary pump are expensive. A further disadvantage is that, because of the high pressure generated during the operation of the pump, disturbing and, in some cases, very annoying noises occur. Also expensive is a reservoir which can be charged by the auxiliary pump and the electrically controllable 3/2-way valve which controls the action on the separating piston and the hydraulic control inputs to the 2/2-way valves. Furthermore, the respective 2/2-way valve has to be combined with a non-return valve function because of the configuration of the cylinder and its separating piston so that, during a braking operation taking place automatically, it is possible to transfer immediately to normal braking operation by brake pedal actuation alone. In the embodiment example published, the symbol for a non-return valve is therefore associated with the second position of the 2/2-way valve. In principle, a normal 2/2-way valve could also be used at this position in accordance with the prior art and a normal non-return valve, which can be opened by positive pressure from the main brake cylinder in the direction of the wheel brakes can be arranged in the by-pass with it.

A vehicle hydraulic brake system with an anti-lock protection and drive-slip control device is known from the publication EP 0 482 367 A1. The anti-lock protection device operates in accordance with the known feed-back principle with one feed-back pump per brake circuit. The wheel brakes of the drivable wheels are associated with one of the two brake circuits. This brake circuit includes a leakage-free auxiliary pump which supplies one inlet of the feed-back pump with low pressure in order to carry out drive-slip control operation. The low pressure is set by means of an auxiliary pressure limiting valve associated with the auxiliary pump. A by-pass, in which a throttle is installed, leads around the auxiliary pressure limiting valve. Downstream of this throttle, there is a non-return valve, which can be opened to the inlet of the feed-back pump and which is intended to prevent empty-ing of the brake circuit through the throttle. Faulty sealing of the non-return valve due to corrosion or dirt cannot be recognized in a normal braking operation but acts abruptly and disadvantageously in anti-lock protection operation.

In an anti-lock protection and drive-slip control device likewise equipped with at least one feed-back pump, it is known from the publication DE 40 39 661 A1 to supply the inlet of the feed-back pump from a reservoir, for the drive-slip control operation, through a 2/2-way valve, which can be opened electrically. The reservoir consists essentially of a cylinder, a piston which can be displaced in the latter and a piston drive spring which generates the auxiliary pressure with which the feed-back pump can be supplied so that the brake circuit remains closed even in drive-slip control operation. Furthermore, an electrical drive is provided which draws the piston into an initial position against the force of the piston drive spring. Furthermore, an electrical switch is necessary for switching off the electrical drive as soon as the piston reaches its initial position. Furthermore, a releasable lock, which holds the piston in its initial position and only releases it when drive-slip control operation begins, is necessary. These means for generating an auxiliary pressure charging the feed-back pump are recognizably expensive overall. In addition, the electrically operating means, together with the associated switches, must be monitored for functional capability by a specially configured electronic monitoring device. A further disadvantage consists in the fact that in the case of a leak, during drive-slip control operation, from a 2/2-way valve installed in a main brake conduit, pressure medium can drain to the main brake cylinder with the result that a brake pressure necessary for the drive-slip control operation is lost so that the cylinder supplying the pressure medium is exhausted. The latter has the additional disadvantage that if normal braking by brake pedal actuation has to replace a drive-slip control braking operation, pressure medium from the main brake cylinder drains into the cylinder and is therefore not available to the wheel brakes. The driver may possibly be surprised by this in the case of an overtaking procedure which has to be interrupted.

A two-circuit vehicle hydraulic brake system with a main brake cylinder having a reservoir, with wheel brakes for drivable and non-drivable wheels and, arranged between them, an anti-lock protection and drive-slip control device which has two feed-back pumps is also known from the German Offenlegungsschrift 40 35 527 (U.S. Pat. No. 5,205, 623 . . . from Ser. No. 07/786,672) Nov. 1, 1990. One inlet of the feed-back pump which is associated with wheel brakes of drivable wheels can be supplied for drive-slip control operation from the reservoir of the main brake cylinder through a 2/2-way valve which is normally closed and can be opened electrically. A particular feature consists in the fact that this 2/2-way valve is only opened as long as the brake pressure has to be increased in drive-slip control operation in at least one wheel brake of a drivable wheel. This has the advantage that the feed-back pump, of self-priming configuration in this case, only obtains pressure medium from the reservoir for increasing brake pressure. During those intervals in which brake pressures are kept constant, the feed-back pump obtains no pressure medium from the reservoir and cannot therefore force pressure medium through a safety valve which has to be set to a high opening pressure. During such intervals, therefore, drive energy is saved and the development of noise is kept low. It is, however, disadvantageous that the feed-back pump can induce air and force it into the brake circuit when the reservoir is not sufficiently full and the pressure medium swashes within it, with the result, possibly, of at least partial failure of the braking force.

ADVANTAGES OF THE INVENTION

The vehicle hydraulic brake system has the advantage that the auxiliary pump only needs to supply, by means of the separating piston, the pressure for filling the respective feed-back pump through its inlet. This pressure is recognizably substantially less than an average or even full braking pressure which is required, for example, to overbrake or even lock front wheels in accordance with the proposal in the German Offenlegungsschrift 38 27 833. If the automatic braking for improving the driving behaviour or for drive-slip control should take place, for example, on smooth ice which has been made wet by rain, only the pressure for filling the feed-back pump is then likewise necessary and this feed-back pump finally generates those substantially higher pressures from which braking pressures for braking and for compensating for excessive drive torque are obtained. Because these pressures to be supplied by the auxiliary pump are recognizably low, little drive power is required. The drive motor can be configured to be correspondingly lighter. The combination of auxiliary pump and drive motor causes substantially less noise than the auxiliary pump of the prior art operating at high pressure.

Advantageous further developments and improvements of the hydraulic motor vehicle brake system are possible by means of the measures listed herein.

The characterizing features of the invention have the advantage that the auxiliary pump actually only needs to supply the relatively low supply pressure for filling the feed-back pumps. This effectively limits the development of pump noise. Other characterizing features have the advantage that a return of the respective separating piston into its initial position after the auxiliary pump has been switched off is ensured without the use of a 3/2-way valve of the prior art. Although flow takes place through the throttle cross-section during operation of the auxiliary pump, the throttle cross-section causes only unsubstantial extra work for the auxiliary pump because, as already mentioned, only a small pressure has to be built up. Additional characterizing features provide a practical embodiment example which is particularly advantageous when the auxiliary pump is configured as a piston pump and, therefore, exhibits practically no throttle cross-sections such as are otherwise exhibited by gear pumps or vane pumps.

Further characterizing features have the advantage that the respective 2/2-way valve is accommodated in a manner which is economical in space and labour. However, at least one seal, which is otherwise required for a separate control piston and which can be the cause of loss of pressure medium, is saved. A further advantage consists in the fact that the 2/2-way valve is reliably closed during a first partial stroke of the separating piston so that the major part of the available separating piston stroke is actually available for the supply of pressure medium for the feedback pump.

Other characterizing features provide the advantage that even if the auxiliary pump induces not only a pressure medium but also air bubbles from the reservoir during an automatic braking operation, such air bubbles are prevented from entering the respective brake circuit even in the case of a defective separating piston seal. This is because it is easier for the air bubbles to escape upwards between the two seals of the separating piston in the direction of atmospheric pressure than to penetrate into the brake circuit against the positive pressure in the latter. Further characterizing features provide the advantage that the separating piston, and also the cylinder in the region between the two sealing rings, is protected from corrosion by means of the pressure medium. Additional characterizing features provide an overall low-cost embodiment example in terms of the integration of the 2/2-way valve in the cylinder. This also provides the additional advantage that in the case of a closing spring which is designed to be correspondingly weak and in the case of appropriate preload on installation of the said closing spring, the effect of a non-return valve appears so that this non-return valve can be opened against the auxiliary pressure by means of positive pressure from the main brake cylinder. From the opening of the 2/2-way valve, which undertakes the function of a non-return valve, the separating piston is displaced to its initial position because the opening pressure of the pressure limiting valve of the auxiliary pump is overcome. The difference between a normal braking operation by brake pedal and braking in an automatic braking operation consists essentially in the fact that in the latter case, brake pedal resistance can already be felt immediately after the brake pedal actuation because, during the automatic braking operation, the braking circuit is already under pressure. The characterizing features set forth herein provide the advantage that during braking in an automatic braking operation, pressure medium can reach the secondary chamber from the main brake cylinder.

The vehicle brake system has the advantage that, on the one hand, the 2/2-way valve can be closed for automatic braking operation by displacing the separating piston and, when a normal braking operation is initiated during an automatic braking operation, the auxiliary pressure can immediately be felt. As soon as the brake pressure has moved the separating piston back into its initial position when the auxiliary pressure is overcome, essentially the usual relationship between brake pedal displacement and the increasing brake pedal resistance then occurring can be felt at the brake pedal. To this extent, the vehicle hydraulic brake system is comfortable to use. The characterizing features have the further advantage that faulty sealing of the 2/2-way valve or of one of the two sealing rings of the floating piston or of a separating piston sealing ring which seals the secondary space can be felt because the brake pedal drops when it is actuated. A fault indication for the additional device serving the automatic brakes therefore takes place in the same manner as occurs in the case of the generally known main brake cylinder.

The characterizing features have the advantage that, in a given case, the feed-back pump generates disturbing pump noise only during automatic brake pressure reductions and during renewed increase in brake pressure. Between these two phases, the feed-back pump causes only idling noise and requires little drive energy. The characterizing features can be used additionally or alternatively and have the advantage that during an automatic braking operation, the feed-back pump only needs to provide pump work when pressure medium flows into its inlet.

BRIEF DESCRIPTION OF THE DRAWINGS

Two embodiment examples of the vehicle hydraulic brake system according to the invention are represented in the drawings.

DESCRIPTION OF THE EMBODIMENT EXAMPLES

First Embodiment Example

Figure 1:
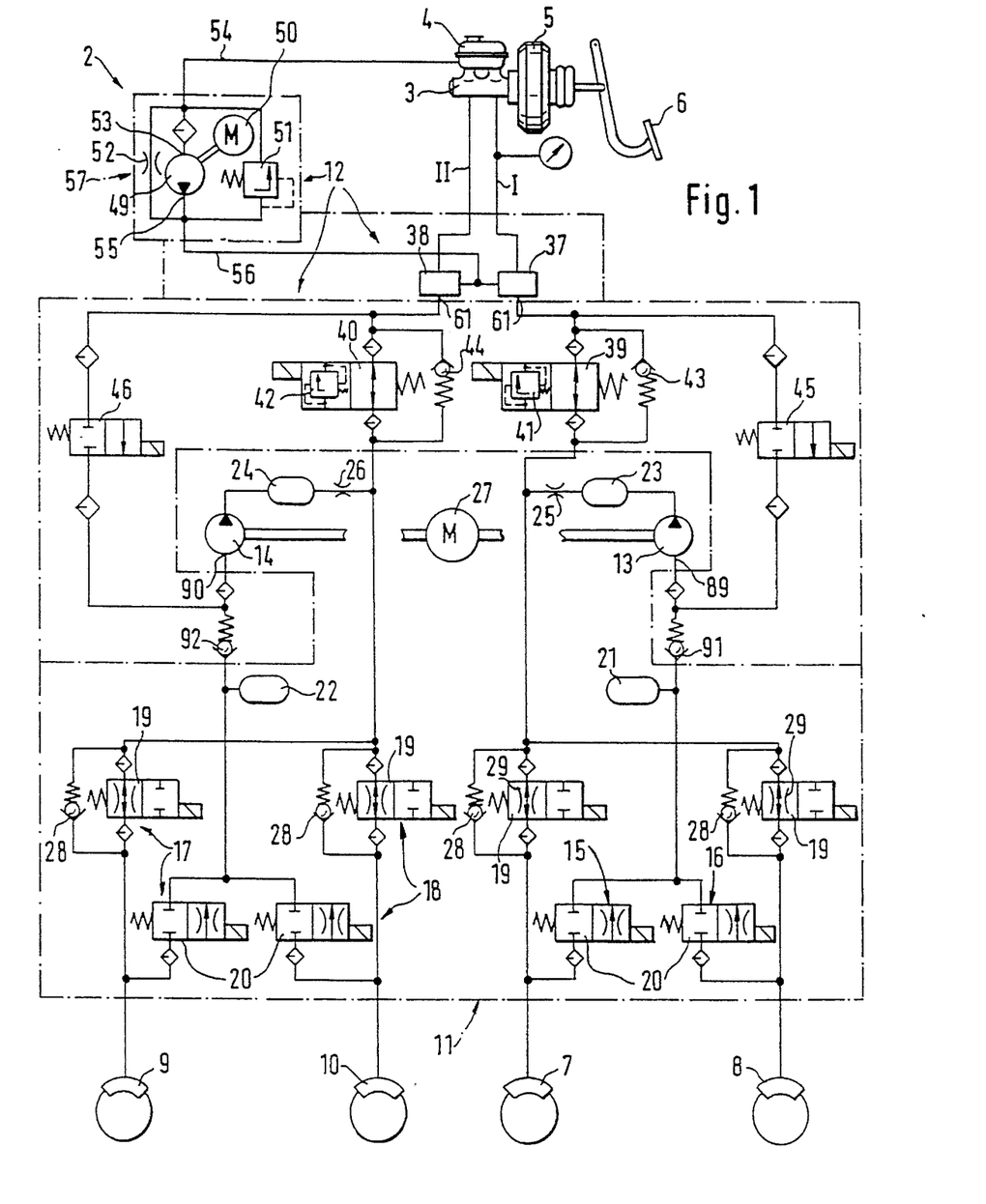
FIG. 1 shows a first embodiment example.

The embodiment example of the vehicle hydraulic brake system according to the invention, as shown in FIG. 1, has a two-circuit main brake cylinder 3 with a reservoir 4 supplying it and, for example, a pneumatic braking force amplifier 5 and a brake pedal 6, two brake circuits I and II, front wheel brakes 7 and 8 associated with the brake circuit I, rear wheel brakes 9 and 10 associated with the brake circuit II, an anti-lock protection device 11 arranged between the main brake cylinder 3 and the wheel brakes 7 to 10 and an additional device 12 for automatic braking.

The main brake cylinder 3 is constructed in a manner known per se and can be actuated with the aid of the brake pedal 6 so that brake pressures occur in the brake circuits I and II. The action which can be exerted on the main brake cylinder 3 by means of the brake pedal 6 can be amplified by means of the braking force amplifier 5. The reservoir 4 supplies the main brake cylinder 3 with pressure medium which can be forced from the main brake cylinder 3 in the direction of the wheel brakes 7 to 10 through the additional device 12 and the anti-lock protection device 11 for normal braking operation.

The anti-lock protection device 11 is an anti-lock protection device of the so-called feed-back type and has, in this case, a feed-back pump 13 for the brake circuit I and a feed-back pump 14 for the brake circuit II. Furthermore, the anti-lock protection device 11 has a specific brake pressure modulation valve arrangement 15, 16, 17 and 18, respectively, for each of the wheel brakes 7 to 10. Each of the brake pressure modulation valve arrangements consists of a brake pressure build-up valve 19 and a respective brake pressure reduction valve 20 and it also has reservoir chambers 21 and 22, respectively, for each brake circuit I and II. In addition, a first damping chamber 23 for the brake circuit I and a second damping chamber 24 for the brake circuit II and damping throttles 25 and 26, respectively, are also, for example, provided. A motor 27 is arranged as the drive for the feed-back pumps 13 and 14. Starting from the wheel brakes 7 to 10, their respectively associated brake pressure build-up valves 19 can be by-passed in the direction of the main brake cylinder 3 by means of non-return valves 28, which can be opened in the direction towards the main brake cylinder 3 in the case of a pressure drop over the respective brake pressure build-up valve 19 when, for example, the latter is driven into its shut-off position or if an installed throttle is effective in its normal open position.

Anti-lock protection operation is possible by means of the individual elements mentioned for the anti-lock protection device 12. For this purpose, the normally open brake pressure build-up valves 19 are located between the respective wheel brakes 7 to 10 and the main brake cylinder 3 so that pressures generated in the main brake cylinder 3 by actuation of the brake pedal 6 can normally reach the wheel brakes 7 to 10. Brake pressure reduction valves 20, which are part of the brake pressure modulation valve arrangements 15, 16 and 17, 18 and are likewise respectively connected to the wheel brakes 7 to 10, are closed in the normal position and permit throttled passage in the activated position, and are also connected to the inlet end of the feed-back pump 13 of the brake circuit I and, respectively, to the inlet end of the feed-back pump 14 of the brake circuit II. The damping chambers 23 and 24 are connected to the outlet end of the feed-back pumps 13 and 14, respectively. The throttles 25 and 26 follow the damping chambers 23 and 24, respectively, in the direction towards the main brake cylinder 3 and towards the respective brake pressure build-up valves 19.

Figure 3:
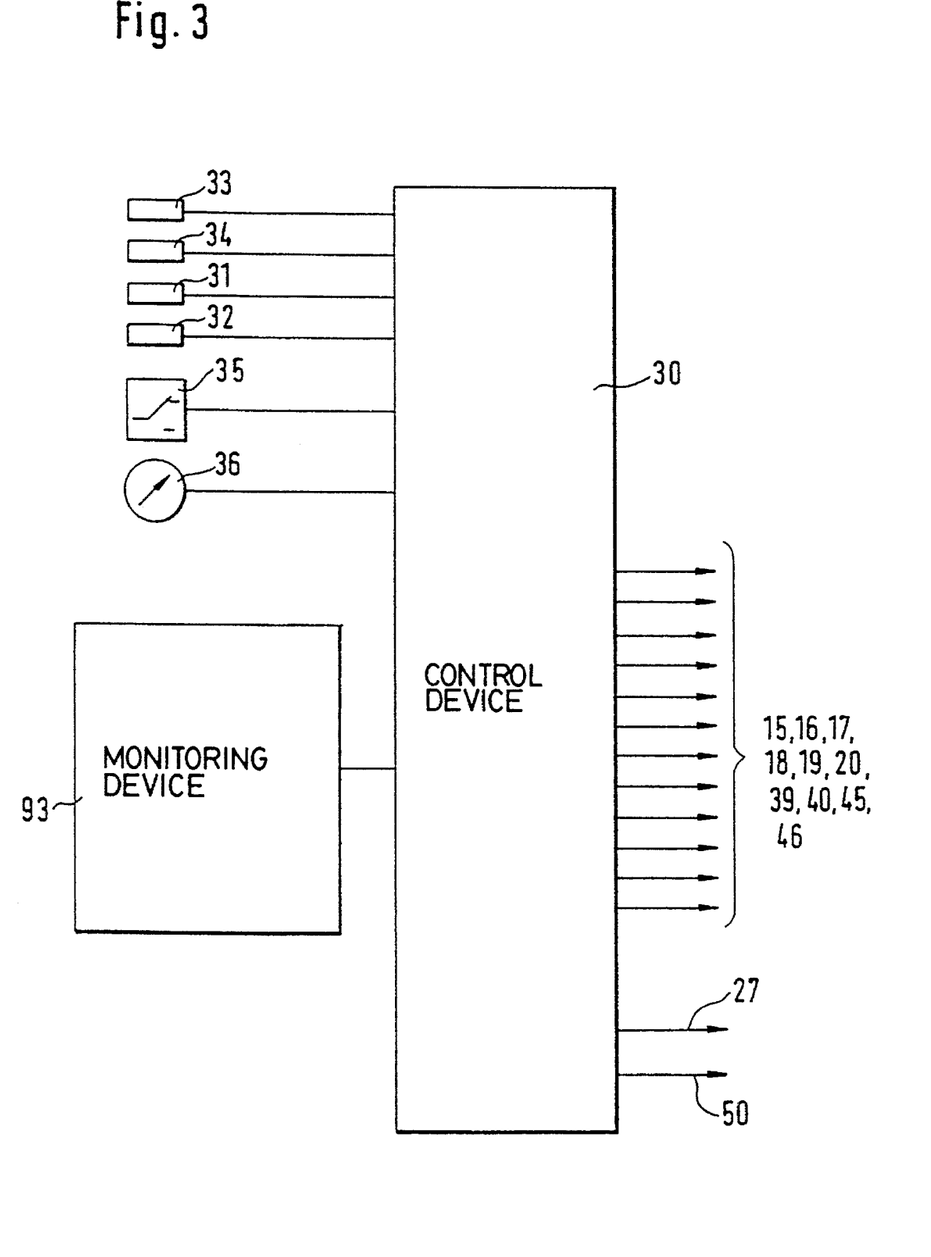
FIG. 3 shows an electrical block circuit diagram for the embodiment example of FIG. 1.

The anti-lock protection device 11 also includes a control unit 30, which is represented in outline in FIG. 3, and the wheel rotation sensors 31 to 34 associated with the wheels (not shown) of the wheel brakes 7 to 10. The control unit 30 is connected to these wheel rotation sensors 31 to 34. The individual valves 19, 20 of the brake pressure modulation valve arrangements 15 to 18 are connected to the control unit 30 at one end and the motor 27 is connected at the other end. Furthermore, a brake pedal switch 35 and/or a pressure sensor 36, which are connected to the control unit 30, can be arranged in the region of the brake pedal 6, for example.

Pressure is generated in the main brake cylinder 3 by actuation of the brake pedal 6 with, for example, help from the braking force amplifier 5 and this pressure propagates through the open brake pressure build-up valves 19 of the two brake circuits I and II to the wheel brakes 7, 8, 9 and 10.

If, for example, the brake pedal 6 is actuated increasingly strongly on a road surface of uniform adhesion, the series of signals emitted by the wheel rotation sensors 31 to 34 change in a manner which the control unit 30 finally interprets as a danger of wheel lock. Assuming that the danger of wheel lock appears with equal strength simultaneously on all the wheels, the control unit 30 switches on the motor 27, and with it the feed-back pumps 13 and 14, closes all the brake pressure build-up valves 19 of the brake pressure modulation valve devices 15 to 18 and opens all the associated brake pressure reduction valves 20. The result of this is that the pressure, which may still be rising in the main brake cylinder 3, does not reach the wheel brakes 7 to 10 but, on the contrary, pressure medium quantities drain from these wheel brakes to the reservoir chambers 21 and 22, respectively. Pressure medium quantities then flow into the feed-back pumps 13 and 14 from the reservoir chambers 21 and 22. In consequence, these feed-back pumps 13 and 14 force pressure medium through the damping chambers 23 and 24 and the throttles 25 and 26 and through the two brake circuits I and II back to the main brake cylinder 3. After the end of the danger of wheel lock (it is assumed in the present case that the danger of wheel lock disappears by chance simultaneously at all the wheel brakes 7 to 10), the brake pressure modulation valve arrangements 15 to 18 are brought into their basic positions by the control unit 30 ending the supply of control currents necessary for the reduction of brake pressure. If, for example, no further danger of wheel lock occurs during a following preselected interval, the control unit 30 then also ends the supply of current to the motor 27.

In a manner which is known per se, the control unit 30 is also, for example, arranged in such a way that pressures from the front wheel brakes 7 and 8 can be modulated individually and independently of one another so that the most favourable braking effect possible of the front wheels can be generated on road surfaces with friction coefficients which differ in strips. As an example, a low friction coefficient can be present on the right at the edge of a road surface due to icing and a high friction coefficient can be present under the vehicle on a dry road surface strip at the left.

Such an individual open-loop or closed-loop principle can also be applied to the rear wheel brakes 9 and 10 but, for example, use is also made under certain conditions of a so-called "select low" closed-loop control, i.e. when one of the rear wheels threatens to lock, the brake pressure is also reduced in the wheel brake of the other rear wheel. Although the contribution to the vehicle deceleration supplied by the rear wheel brakes may be reduced by this in a given case, it may provide very advantageous driving behaviour by supporting side guidance forces when travelling around a bend. A favourable effect on the driving behaviour is here meant in the sense that drift of the rear wheels to the side out of the bend can be suppressed. The "select low" closed-loop control discussed, of the rear wheel brakes 9 and 10, is therefore a useful measure for influencing the motion behaviour of the vehicle, in particular the rotational behaviour about the centre of gravity or about the vertical axis of the vehicle. It is therefore possible to act against an undesired rotational acceleration of the vehicle about the vertical axis, i.e. internal dynamics, of the vehicle, in the manner described.

A device 12 for automatic braking includes, within the respective brake circuits I and II, a control cylinder 37 or 38, a switch-over valve 39 or 40, a pressure limiting valve 41 or 42 and, for safety reasons, one non-return valve 43 or 44, respectively. In addition, 2/2-way valves 45 and 46 and non-return valves 91 and 92 are arranged at the inlet end of the feed-back pumps 13 and 14, respectively. The indirect supply of the device 12 also includes an auxiliary pump 49 with an auxiliary motor 50, an auxiliary pressure limiting valve 51 and a throttle 52.

The auxiliary motor 50 is connected to the control unit 30 and can be switched on by the control unit 30 so that the auxiliary pump 49 can be driven. The auxiliary pump 49 has an inlet 53 which, in the example, is connected via a conduit 54 to the reservoir 4 of the main brake cylinder 3. An outlet 55 is connected via an auxiliary pressure conduit 56 to the two cylinders 37 and 38. The inlet end of the auxiliary pressure limiting valve 51 is connected to the outlet 55 of the auxiliary pump 49 and can be opened in the direction towards the inlet 53 of this auxiliary pump 49 and towards the conduit 54, which communicates with the reservoir 4. The auxiliary pressure limiting valve 51 is, for example, arranged in such a way that it can be opened at a pressure of the order of magnitude of 5 to 10 bar. The throttle 52 is likewise connected to the outlet 55 of the auxiliary pump 49 and it communicates at the other end with the conduit 54 and the inlet 53 of the auxiliary pump 49. When the auxiliary pump 49 is at rest, the throttle 52 ensures the disappearance of pressure differences between the outlet 55 and the inlet 53. In interaction between the control unit 30 and the auxiliary motor 50, the elements listed form a controllable auxiliary pressure source 57.

The cylinders 37 and 38 are of identical configuration. It is therefore only necessary to describe the cylinder 37, using FIG. 2. The cylinder 37 has an end wall 58 and a cover 59 and has, in the region of the end wall 58, a pressure connection 60 for connection to the auxiliary pump 49 and, in the region of the cover 59, a connection 61 to the anti-lock protection device 11. It also has a connection 62 to the main brake cylinder 3. The cover 59 is held in the cylinder 37 by means, for example, of a wire ring 63 which fits into a groove 64 machined in the cylinder 37. A sealing ring 65 prevents pressure medium from passing between the cylinder 37 and the cover 59.

Figure 2:
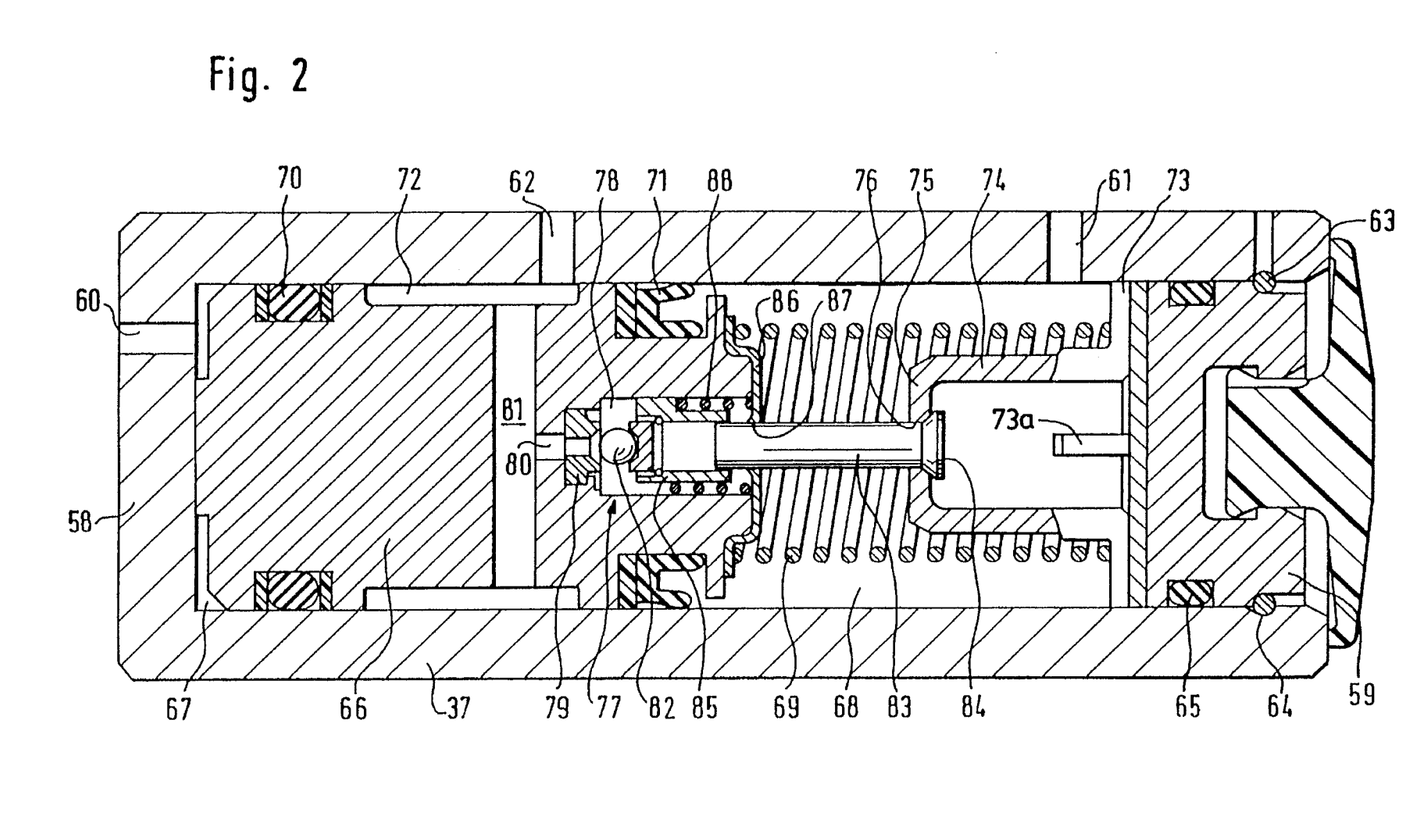
FIG. 2 shows a detail of the embodiment example of FIG. 1 to an increased scale with the valve in an open position
Figure 2A:
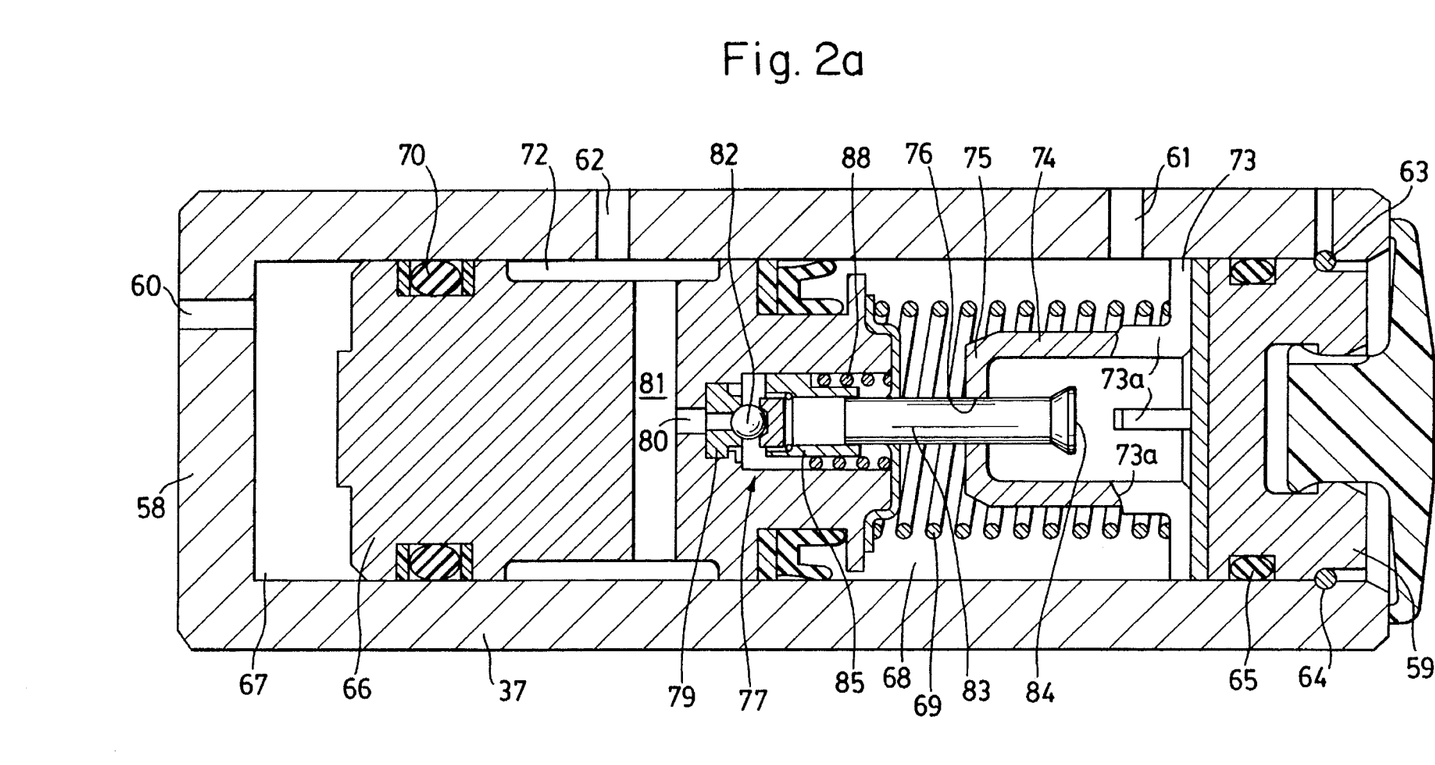
FIG. 2a illustrates the valve in a closed position.
Figure 2B:
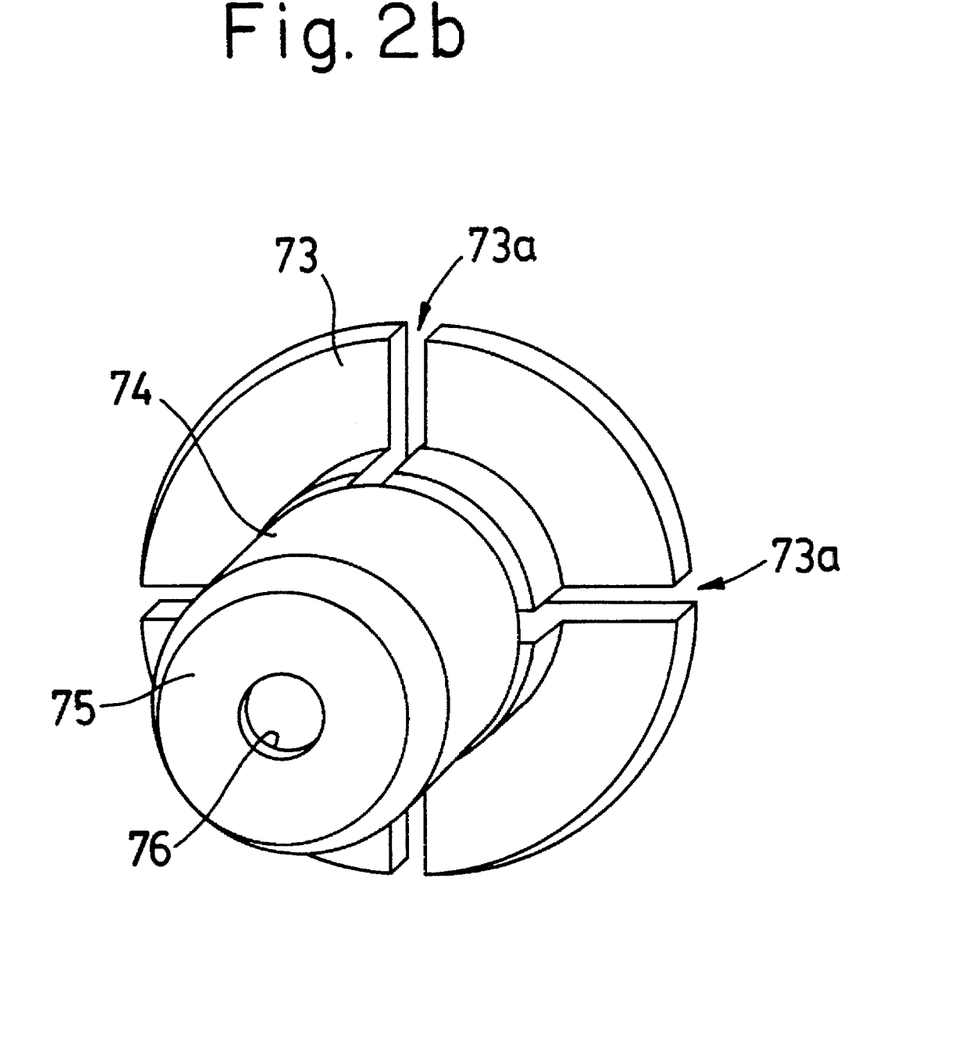
FIG. 2b illustrates an enlarged view of a tubular component having slots in one end.

A separating piston 66, which divides an internal space of the cylinder 37 between the end wall 58 and the cover 59 into a primary space 67 and a secondary space 68, can be displaced within the cylinder 37. Starting from the initial position in contact with the end wall 58, as represented in FIG. 2, the volume of the primary space 67 can be increased and the volume of the secondary space 68 can be reduced depending on the position of the separating piston 66. A separating piston return spring 69 is installed between the separating piston 66 and the cover 59. In the installed condition, the separating piston return spring 69 is preloaded to fix the basic position of the separating piston 66 in contact with the end wall 58. The separating piston 66 has a first piston sealing ring 70 in the region of the primary chamber 67 as shown in FIG. 2*a* and a second piston sealing ring 71 in the region of the secondary chamber 68. The separating piston 66 has a neck 72 in a region between the two piston sealing rings 70 and 71. The piston sealing ring 71 is preferably configured as a lip sealing ring around which a flow of pressure medium can occur when there is a pressure drop from the connection 62 to the connection 61. Between the separating piston return spring 69 and the cover 59, there is a spring plate 73 on which the separating piston return spring 69 is in contact, with the preload already mentioned. A tubular extension 74 emerges from the spring plate 73 in the direction towards the separating piston 66 and this extension 74 merges into an axial stop 75. The spring plate includes equally spaced slots 73a which extend along a portion of the tubular extension as shown in FIGS. 2, 2a and 2b. Therefore, any fluid that enters the tubular extension can flow between the valve stem 83 and the opening when the valve is open or through the slots 73a. The axial stop 75 has an opening 76 in the longitudinal axis of the cylinder 37. There is a distance between the axial stop 75 and the separating piston 66. In the axial direction of the separating piston 66, the neck 72 has a longitudinal extent which is at least as long as the distance between the axial stop 75 and the separating piston 66. The connection 62 is placed on the cylinder 37 in such a way that it communicates with the neck 72 in all possible positions of the separating piston 76.

A 2/2-way valve 77 is accommodated in the longitudinal axis of the separating piston 66. For this purpose, a valve chamber 78 is accommodated in the separating piston 66. A valve seat 79 is installed in the separating piston 66 so that it is adjacent to the valve chamber 78. Passages 80, 81 start from the valve seat 79. In the example, the passage 80 consists of a longitudinal hole and the passage 81 is formed by a transverse hole which opens into the neck 72. The valve seat 79 can be closed by means of a valve ball 82. The valve ball 82 is fastened to a valve stem 83 which extends out of the valve chamber 78 and into the opening 76 of the axial stop 75. Within the tubular extension 74, the valve stem 83 merges into a collar 84 which can be brought into contact with the axial stop 75. Within the valve chamber 78, the valve stem 83 is surrounded by a stepped sleeve 85. The step with the smaller diameter points towards the axial stop 75. There is a further spring plate 86 between the separating piston return spring 69 and the separating piston 66. In the longitudinal axis of the separating piston 66, the spring plate 86 has a central opening 87 through which the valve stem 83 extends with movement clearance.

A closing spring 88 surrounds the smaller diameter part of the stepped sleeve 85 and is supported on the larger diameter part and on the spring plate 86. The length of the valve stem 83 is selected in such a way that, when the separating piston 66 is in the normal or initial position and when the collar 84 is in contact with the axial stop 75, the valve ball 82 does not close the valve seat 79. The valve seat 79 only comes into contact with the valve ball 82 when there is a displacement of the separating piston 66 so that the closing spring 88 comes into effect and presses the ball 82 against the valve seat 79. With further movement of the separating piston 66, the valve stem 83 is additionally moved so that the collar 84 is released from the axial stop 75. If the closing spring 88 is installed with a limited preload, the 2/2-way valve 77 can be opened in the manner of a non-return valve if there is a sufficient pressure drop from the neck 72 in the direction towards the secondary chamber 68.

As already mentioned, the connection 62 is connected to the main brake cylinder 3. The cylinder 38 is analogously also connected to the main brake cylinder 3 by means of its brake circuit II. The connection 61 of the cylinder 37 is connected to the brake pressure build-up valves 19 of the brake pressure modulation valve arrangements 15 and 16 by the normally open switch-over valve 39 of the brake circuit I. A by-pass which can be opened in the direction towards the brake pressure modulation valves mentioned is placed in the direction from the cylinder 37 to the brake pressure modulation valve arrangements 15 and 16 by means of the non-return valve 43. The switch-over valve 39 is preferably combined with the pressure limiting valve 41 so that, in the case of electrical activation, a passage in the direction towards the main brake cylinder 3 (instead of a free passage) only occurs when there is a sufficient pressure drop between the brake pressure build-up valves 19 and the main brake cylinder 3. This pressure drop has such a magnitude that when the main brake cylinder 3 is not actuated, the pressure present before the pressure limiting valve 41 is sufficient for automatic braking operations and, if necessary, for locking the wheels.

In a similar manner, the switch-over valve 40, the pressure limiting valve 42 and the non-return valve 44 are installed between the cylinder 38 and the brake pressure build-up valves 19 of the brake pressure modulation valve arrangements 17 and 18.

The 2/2-way valves 45 and 46 are closed in their normal positions and can be opened electrically. These 2/2-way valves 45 and 46 are located between the connections 61 of the cylinders 37 and 38, respectively, and inlets 89, 90 of the feed-back pumps 13 and 14, respectively. For the purpose of disconnecting the secondary spaces 68 of the cylinders 37 and 38 from the reservoir chambers 21 and 22, respectively, the non-return valves 91 and 92 mentioned are in each case arranged between these reservoir chambers 21 and 22 and the 2/2-way valves 45 and 46. These non-return valves 91 and 92 can be considered as belonging to the device 12 because it is only the carrying out of antilock protection operation which makes these non-return valves 91 and 92 unnecessary when so-called free-piston pumps are used as the feed-back pumps 13, 14.

A black box 93 is associated with the additional device 12 in FIG. 3. The black box includes, for example, such means as are described individually in the introductory description for monitoring the vehicle for incipient danger of skidding. For this reason, mention is only made here of key words such as gyroscope unit and monitoring the rotation acceleration, acceleration sensors, further use of wheel rotation sensors and wheel-slip measuring devices and limiting value switches for obtaining control signals, which act on the control circuit 30 and by means of this control the auxiliary pressure source 57, the feed-back pumps 13 and 14 and the brake pressure modulation valve arrangements 15 to 18, the switch-over valves 39 and 40 and the 2/2-way valves 45 and 46.

If, for example, danger of skidding appears, on a vehicle equipped according to the invention, during travel around a bend without the use of brakes, this is recognized by the monitoring device outlined by the black box 93 which, when a specified limiting value is exceeded, drives—for example—the brake pressure build-up valves 19 of the rear wheel brakes 9 and 10 into the shut-off positions, switches on the auxiliary motor 50, opens the 2/2-way valve 45, closes the switch-over valve 39 and switches on the motor 27 to drive the feed-back pump 13. Because of this, the auxiliary pump 49 generates auxiliary pressure which reaches the primary chamber 67 of the cylinder 37 via the conduit 56 and displaces the separating piston 66. The separating piston 66 then closes the 2/2-way valve 77 and a pressure occurs in the secondary chamber 68 so that pressure medium flows out of this secondary chamber 68 through the open 2/2-way valve 45 to the inlet 89 of the feed-back pump 13 and through the non-return valve 43 to the wheel brake cylinders 7 and 8. The feed-back pump 13 is therefore filled indirectly by means of the auxiliary pressure fed into the cylinder 37 so that this feed-back pump 13 can build up pressure before the closed switch-over valve 39, which pressure reaches the wheel brakes 7 and 8 through the open brake pressure build-up valves 19 of the brake pressure modulation valve arrangements 15 and 16. In this case, therefore, both front wheels are braked, for example, so that, as is taught by the prior art, the side guidance forces of the front wheels are also reduced. This has the desired effect that side slip occurs or is increased to the order of magnitude or, if necessary, above the magnitude of the side slip of the rear wheels. This has the intended result of acting against an increase in the rotational velocity of the vehicle about the vertical axis, i.e. skidding, or of ending a skid.

If a brake pressure intended in the sense mentioned above has been achieved, the brake pressure build-up valves 19 of the brake pressure modulation valve arrangements 15 and 16 are closed so that the brake pressures in the wheel brakes 7 and 8 remain constant, at least initially. Because, during such an interval, pressure medium delivered in excess by the feed-back pump through the pressure limiting valve 41 would cause useless energy consumption and annoying pump noise, the 2/2-way valve 45 can be temporarily closed during such an interval by means of the control unit 30. Because of this, the inlet 89 of the feed-back pump 13 has no pressure medium supplied and the feed-back pump runs empty.

If the associated means in the black box 93 determine that a danger of skidding has been acted against to a sufficient extent, i.e. that the value is less than a preselected limiting value, the brake pressure initially enclosed in the wheel brakes 7 and 8 can be at least partially reduced. This is achieved by opening the brake pressure reduction valves 20 of the brake pressure modulation valve arrangements 15 and 16. By this means, pressure medium reaches the reservoir chamber 21 from the wheel brakes 7 and 8 and, finally, also reaches the feed-back pump through the non-return valve 91 and is forced back from there through the pressure limiting valve 41 into the cylinder 37. The separating piston 66 then moves back against the smaller auxiliary pressure set by the auxiliary pressure limiting valve 51.

If a renewed build-up of brake pressure is required, the 2/2-way valve 45 is opened so that the feed-back pump 13 can again build up pressure which can be fed to the wheel brakes 7 and 8 by means of the brake pressure build-up valves 19 in the manner already described.

In the case described, only the wheel brakes 7 and 8 are used to improve the travelling behaviour of the vehicle in a bend. For the case described above, it was assumed that there was danger of skidding due to drifting of the rear axle, i.e. there was a so-called oversteer tendency. Vehicles with an oversteer tendency are widespread but there are also vehicles with an understeer tendency. It can, in fact, happen that a vehicle exhibits an oversteer tendency on one occasion and an understeer tendency on another occasion, depending on the type of loading. If an understeer tendency appears, the dynamics, which arise from a lack of side guidance force from the front wheels, can be acted against in a compensating manner by automatically reducing the side guidance forces of the rear wheels. For this purpose, brake pressures have to be supplied automatically to the rear wheel brakes 9 and 10. This takes place in an analogous manner to the one described in the case of the wheel brakes 7 and 8 of the front wheels. A further description, which would only differ 10 from the previous description by other reference signs, can therefore be omitted.

In addition to occurring during driving with a substantially constant speed, the danger of skidding can also be initiated by braking on a bend. This is particularly so because a dynamic increase in the load on the front wheels and a dynamic reduction in the load on the rear wheels occurs during braking even though the mass centre of gravity of the vehicle maintains its alignment relative to the front axle and the rear axle. Rear wheel side guidance forces are therefore recognizably weaker in tendency relative to the side guidance forces of the front wheels so that a rotational acceleration of the vehicle about its centre of gravity can take place and an unallowable limiting value can be reached. In this case, it is necessary to increase automatically a brake pressure which has been selected for the front wheel brakes 7 and 8 by the driver actuating the brake pedal 6. This is also possible by putting into operation the additional device 12 and the anti-lock protection device 11. When these are put into operation, the combination of the anti-lock protection device 11 and the additional device 12 for automatic braking overrules the wishes of the driver. If, therefore, the driver has already braked, the automatic braking operation then effects an increased braking pressure, at least for one of the front wheel brakes, so that the sum of the side guidance forces of the front wheels is reduced, as in the prior art described in the introduction.

Because the vehicle brake system is recognizably in a position to control brake pressures automatically and individually in all the wheel brakes of the four vehicle wheels thanks to the four brake pressure modulation valve arrangements 15 to 18, this vehicle brake system is also suitable for carrying out drive-slip control, independently of whether the front wheels or the rear wheels or the front and rear wheels can be driven. Drive-slip control is again carried out in accordance with the known requirements by using the auxiliary pump 49 and the cylinders 37 and 38, the switch-over valves 39, 40 and the 2/2-way valves 45 and 46, together with the anti-lock protection device 11 for the case of drive-slip control on all four wheels. Since drive-slip control devices are notoriously known both for drivable front wheels, with which diagonal brake circuits are associated, and for rear wheels, in which a front/rear brake circuit division is usually selected, a control and functional description for the drive-slip control system is unnecessary.

Depending on the situation, it can be necessary during a drive-slip control operation to increase the pressure present in the respective wheel brakes substantially by brake pedal actuation. This can be achieved by hydraulically overcoming the closing force of the closing spring 88 of the 2/2-way valve 45, which is located in the separating piston 66. If the force on the brake pedal is sufficiently increased, the main cylinder pressure namely increases sufficiently for the ball 82 to be lifted from the valve seat 79 against the closing force of the closing spring 88 and the auxiliary pressure in the secondary chamber 68. On the other hand, however, it is also possible for flow to take place around the lip sealing ring 71. If, at this time, the switch-over valve 39 of the front wheel brakes, which include drivable wheels, should still be closed, the pressure opens the non-return valve 43, which forms a by-pass around the switch-over valve 39 (through which no flow can occur), so that an increase in brake pressure is possible in the wheel brakes 7 and 8 in the manner desired by the driver. Although the separating piston 66 will move towards the end wall 58 in the direction of its initial position because it is subjected, from the secondary space 68, with a higher pressure than the auxiliary pressure in the primary space 67, this does not have any disturbing disadvantage because the wheel brakes 7 and 8 were previously filled simply by a displacement of the separating piston 66 by means of the auxiliary pressure.

FIG. 1 is provided with reference signs of the front wheel brakes and the rear wheel brakes in such a way that the brake circuit I is a so-called front axle brake circuit and the brake circuit II is a so-called rear axle brake circuit. Such a brake circuit division is also referred to as a TT brake circuit division. The idea of the invention is not, however, limited to such TT brake circuits because it may be recognized that so-called diagonal brake circuits, which are designated as K brake circuits, are also achieved by exchanging the reference signs of the front wheel brakes and the rear wheel brakes. By this means, all four wheels can be individually and automatically supplied with brake pressures and it is possible to act against a disadvantageous dynamic independent behaviour of the vehicle.

SECOND EMBODIMENT EXAMPLE

Figure 4:
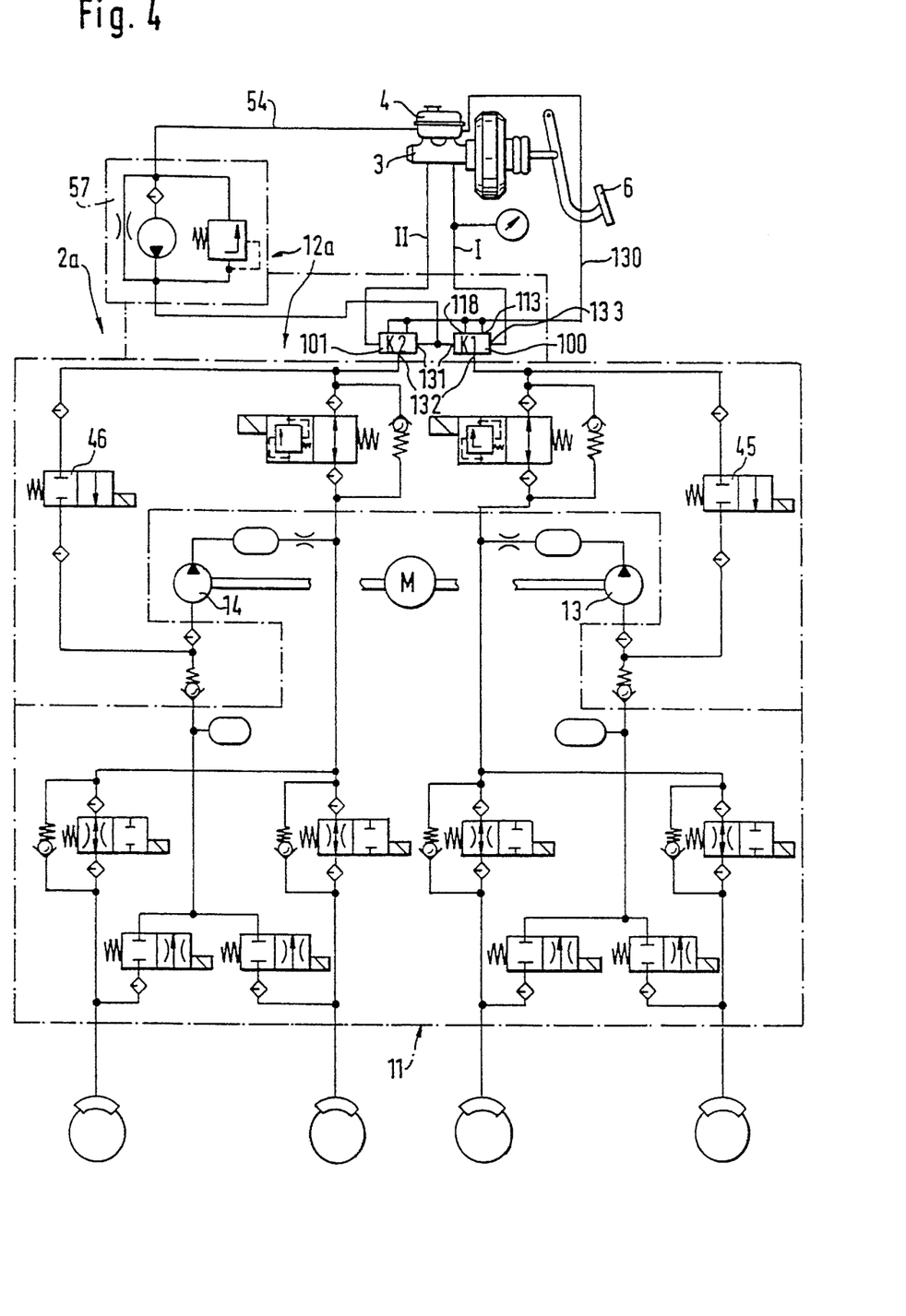
FIG. 4 shows a second embodiment example of the vehicle brake system according to the invention and FIG. 5 shows a detail of the embodiment example of FIG. 4 in longitudinal section to an increased scale.
Figure 5:
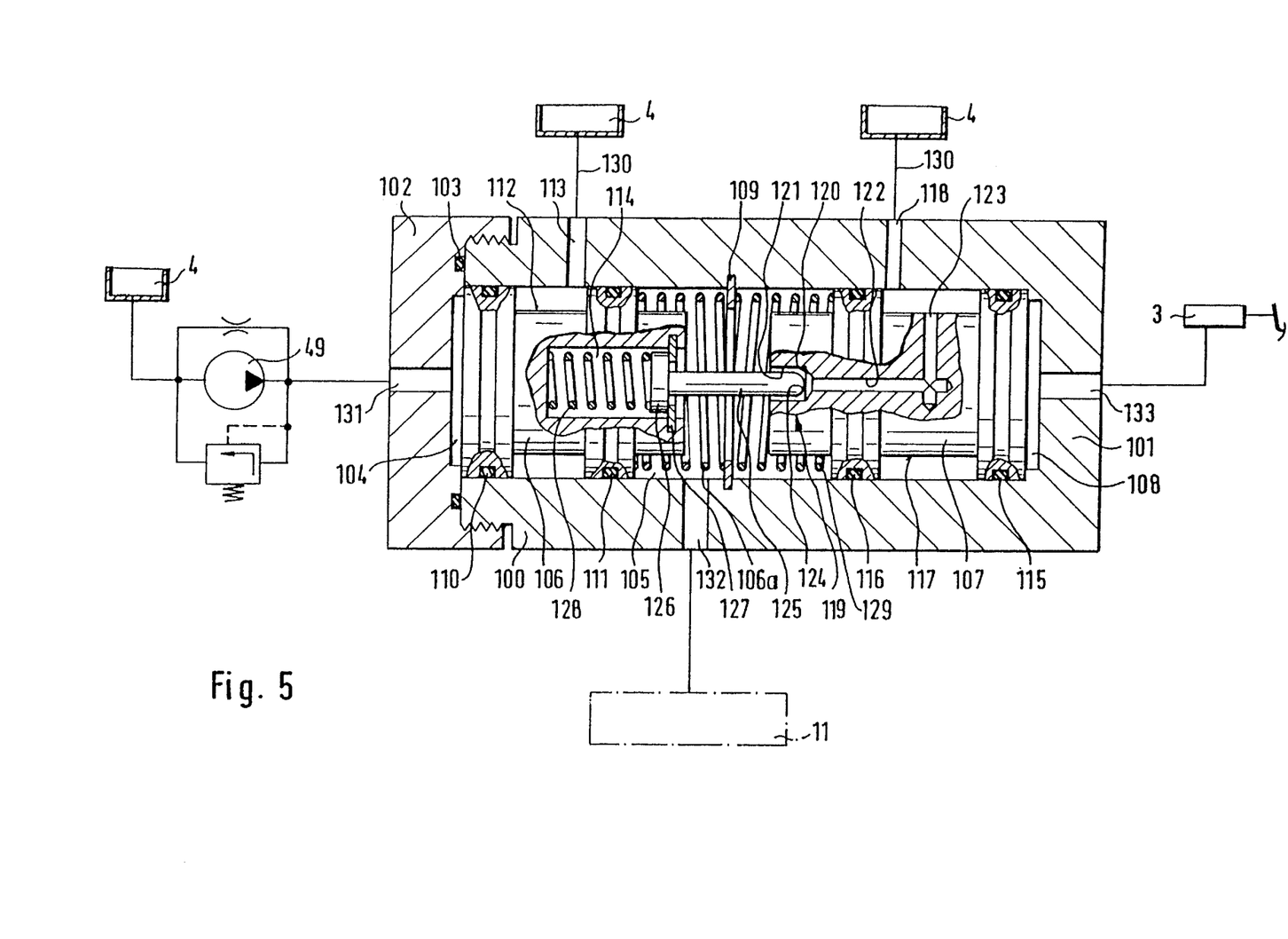

In principle, the second embodiment example, as shown in FIGS. 4 and 5, differs from the first embodiment example, as shown in FIGS. 1 and 2, only in that the cylinder 100 and the separating piston 106 have a different configuration and that the cylinder 100 additionally accommodates a floating piston 107.

The cylinder 100 has an end wall 101 at one end and a screwed-on cover 102 at the opposite end. It also has a sealing ring 103 between the cover 102 and the cylinder 100. The inside of the cylinder 100 between the cover 102 and the end wall 101 is sub-divided, on the one hand, into a primary space 104 adjacent to the cover 102 and a secondary space 105 by the arrangement of the longitudinally displaceable separating piston 106 and, additionally, by the arrangement of a freely displaceable floating piston 107, into an actuation space 108 adjacent to the end wall 102. A separating piston return spring 106a, which is supported in the example on an axial stop 109 let into the cylinder 100 in the manner of a spring ring, is likewise associated with the separating piston 106. The separating piston 106 has a first piston sealing ring 110 and a second piston sealing ring 111 at an axial distance apart. The separating piston 106 has a neck 112 between these piston seals 110 and 111. In the axial direction, the neck 112 is configured to be somewhat longer than a preselected longest displacement path of the separating piston 106. A relief opening 113 in the wall of the cylinder 100 is associated with the neck 112. This relief opening 113 is placed in such a way that it communicates with the neck 112 and is not passed by either of the two piston sealing rings 110 and 111 while the separating piston 106 is in its end positions or intermediate positions. The relief opening 113 is isolated from any normal flow of fluid because of the disposition of the seals 110 and 111 on opposite ends of the separating piston 106. In the event either of the seals 110 or 11 were to rupture, fluid would flow into the area surrounding the neck 112 and would be relieved via the relief opening 113. The relief opening 113 can be connected with the reservoir from which any air would bubble or to the atmosphere. Thus the relief opening prevents air from entering the system. In its longitudinal axis, the separating piston 106 has a spring chamber 114 which is open towards the secondary space 105.

In the region of the actuation space 108, the floating piston 107 has a first sealing ring 115 and, at an axial distance from it towards the secondary space 105, a second sealing ring 116. Between the two sealing rings, the floating piston 107 has a neck 117 whose extent in the axial direction is at least as long as a preselected longest displacement path of the floating piston 107. A supply opening 118 in the wall of the cylinder 101 is associated with the neck 117. The supply opening 118 is aligned in such a way that it communicates with the neck 117 in all the possible displacement positions of the floating piston 107.

A 2/2-way valve 119 is installed in the longitudinal axis of the floating piston 107. It has a valve seat 120 which can, for example, be manufactured by arranging a stepped hole 121, 122 in the longitudinal axis of the floating piston 107, starting from the secondary space 105. The stepped hole 122 then acts as a passage section whereas a further passage section is formed by a transverse hole 123 which opens into the neck 117. A valve closing element 124 is formed from one end of the valve stem 125 on which there is a collar 126. The collar 126 is fitted into the spring chamber 114. An axial stop 127 is associated with the collar 126 in the region of the inlet of the spring chamber 114. Within the spring chamber 114, there is a preloaded closing spring 128 which normally presses the collar 126 in the direction towards the floating piston 107 and, by this means, places the collar 126 on the axial stop 127. A floating piston return spring 129 associated with the floating piston 107 is located in the secondary space 105 in order to press the floating piston 107 into an initial position near the end wall 101. When the floating piston 107 is in this normal position and the separating piston 106 is also in its normal position, the closing element 124 is at a distance from the valve seat 120 in the axial direction. Displacement of the separating piston 106 towards the floating piston 107 or displacement of the floating piston 107 towards the separating piston 106 or simultaneous displacement of the two pistons 106 and 107 towards one another causes a closing of the 2/2-way valve 119.

In the example, the relief opening 113 is connected to the reservoir 4 located at a higher level via a conduit 130 and the supply opening 118 is connected to the reservoir 4 likewise, for example, via the conduit 130. The primary space 104 is connected to the auxiliary pressure source 57 by means of an auxiliary pressure connection 131. A connection 132 starting from the secondary space 105 is used for supplying the associated wheel brakes through the anti-lock protection device 11. An actuation connection 133 associated with the actuation space 108 is connected to the main brake cylinder 3. The cylinder 101 has an identical configuration. Both cylinders 100 and 101 are connected to the main brake cylinder 3 via their actuation connections 133.

Mode Of Operation of the Second Embodiment Example

In the normal position, the 2/2-way valve 119 is in its open position. The result of this is that the secondary space 105 communicates with the reservoir 4 of the main brake cylinder 3 through this 2/2-way valve 119 and through the passage partial pieces 122 and 123 and the neck 117 and through the supply opening 118 and the conduit 130. If the brake pedal 6 is actuated for the purpose of normal braking so that pressure occurs in the main brake cylinder 3, this pressure is propagated in the example for the brake circuit I into the actuation space 108 so that the floating piston 107 is displaced in the direction towards the separating piston 106. As already mentioned, this causes the closing of the 2/2-way valve 119. The secondary space 105 is therefore closed relative to the reservoir 4 and a pressure occurs within the secondary space 105 which is practically as high as the pressure in the main brake cylinder 3. The pressure of the secondary space 105 propagates, in a manner analogous to the first embodiment example, through the non-actuated device 12a and the non-actuated anti-lock protection device 11 into the wheel brakes. The same of course also applies to the cylinder 101 arranged in the brake circuit II. It also supplies brake pressures to supply wheel brakes.

If, during such a normal braking operation, anti-lock protection operation is necessary, the anti-lock protection device 11 operates in a manner similar to that in the first embodiment example. Quantities of pressure medium pumped back by the feed-back pumps 13 and/or 14 displace the respective floating piston 117 in the direction of its initial position so that quantities of pressure medium flow back to the main brake cylinder 3 from the respective actuation space 108. If quantities of pressure medium are again necessary to increase the brake pressure in the respective wheel brakes, these are supplied from the secondary space 105 due to hydraulic action on the floating piston 107; pressure medium also, however, flows from the main brake cylinder 3 and the brake pedal 6 therefore drops in a manner known per se after a previous return stroke.

If the case occurs that it is necessary to brake automatically, the monitoring device 93, outlined by the black box 93, together with the control device 30 activates the pressure source 57, the device 12 and the anti-lock protection device 11 so that its feed-back pumps 13 and 14 are switched on and the various valves are activated in the manner described with respect to the Embodiment Example 1. To this extent, there is no difference from the Embodiment Example of FIG. 1. Switching on the auxiliary pressure source 57 again has the effect that the separating piston 106 is displaced, that the 2/2-way valve 119 is closed and that a pressure is therefore generated in the secondary space 105, this pressure being practically equal to the auxiliary pressure which is forced into the primary space 104 from the auxiliary pressure source 57.

In this embodiment example, it is again possible for brake pressure to be increased in the wheel brakes, in the case of automatic braking, above the pressure which the driver generates in the main brake cylinder 3 by actuating the brake pedal 6. This is possible because, on transition to automatic braking operation, the pressure generated—by action on the actuation space 108—in the secondary space 105 is not used directly for generating the brake pressure in the wheel brakes but, rather, this pressure is made available through at least one of the 2/2-way valves 45 and 46 to the feed-back pumps 13 and 14, respectively, 10 for generating a brake pressure. In this case, the pressure from the main brake cylinder 3 is used only for supplying pressure medium to the at least one feed-back pump. Because, in the operating case described, the pressure in the secondary space 105 is higher than the auxiliary pressure, of the auxiliary pressure source 57, pressure medium which is necessary to substantially increase the pressure arbitrarily selected by the driver is made available by displacement of the floating piston 107 so that, of course, the brake pedal 6 will drop somewhat because of the associated flow of pressure medium out of the main brake cylinder 3.

In the case of a leak at the sealing ring 111, pressure medium can escape from the secondary space 105 in the direction of the neck 112 and the relief opening 113. This can be recognized during braking because the brake pedal drops.

If the other piston sealing ring 110 leaks, this only acts on the automatic braking operation. If the auxiliary pump 49 should induce air from the reservoir 4, air bubbles pass the piston sealing ring 110 and flow away through the neck 112 and the relief opening 113 because they cannot overcome the pressure barrier in the region of the other piston sealing ring 111.

The advantageous arrangement of two piston sealing rings 110 and 111 between a primary space 104, which is typical of the brake system according to the invention, and a secondary space 115 can also be carried across from the embodiment example of FIG. 5 to the embodiment example of FIG. 2. All that is then necessary is a lengthening of the cylinder and a lengthening of the separating piston, the arrangement of a third sealing ring and the arrangement of a neck and the provision of a relief opening.

Because the sealing rings 115, 116 and the 2/2-way valve 119 of the floating piston 107 can be acted on, on the one hand, by an auxiliary pressure or brake pressure but are exposed, on the other hand, to the comparatively very small pressure present in the supply opening 118, a leak at one or more of the elements 115, 116 and 119 can be recognized, just like a leak at the piston sealing ring 111, by the driver during normal braking because the brake pedal 6 drops.

The foregoing relates to a preferred exemplary embodiment of the invention, it being understood that other variants and embodiments thereof.

We claim:

1. A vehicle hydraulic brake system having a two-brake circuit main brake cylinder, comprising a reservoir for the main brake cylinder, two brake circuits for wheel brakes of a motor vehicle, associated with the wheel brakes, an anti-lock protection device which has brake pressure modulation valve arrangements and, per brake circuit, a feed-back pump and an additional device for automatic braking in association with the anti-lock protection device, this additional device having, between a combination of the main brake cylinder and the reservoir, on the one hand, and the anti-lock protection device for this combination, on the other, a cylinder in each brake circuit connected to the anti-lock protection device, each said cylinder including a separating piston, which separates a secondary space from a primary space, a 2/2-way valve, and a separating piston return spring, and a common auxiliary pump with valve means for both brake circuits, the common auxiliary pump supplying pressure into the primary space in automatic braking operation to displace the separating piston and to close said 2/2-way valve of each brake circuit, and having a control unit for controlling the anti-lock protection device in order to avoid a danger of wheel lock and to control the additional device for automatic braking and to improve the driving behavior of the vehicle and for drive-slip control at drivable wheels, the auxiliary pump (49) supplies a pressure to said primary space of said cylinder which is substantially below a full braking pressure which is generated by means of the main brake cylinder (3), the secondary space (69, 105) is connected to an inlet (89, 90) of the feed-back pump (13, 14) by means of an electrically controllable 2/2-way valve (45, 46) of said anti-lock protection device, and in that a combination of a switch-over valve (39, 40) and a pressure limiting valve (41, 42) open towards the secondary space, (69, 105) is arranged between an outlet of said feed-back pump (13, 14) and the secondary space (69, 105).

2. A vehicle hydraulic brake system according to claim 1, in which the valve means of said common auxiliary pump comprises:
an auxiliary pressure limiting valve (51) associated with an outlet (55) of the common auxiliary pump (49), and said auxiliary pressure limiting valve (51) opens at an auxiliary pressure substantially below the full braking pressure.

3. A vehicle hydraulic brake system according to claim 2, in which the outlet (55) of the auxiliary pump (49) is connected to an inlet (53) of said auxiliary pump by means of at leat one throttle cross-section (52).

4. A vehicle hydraulic brake system according to claim 3, in which the 2/2-way valve (77, 119) is accommodated in a cylinder (37, 38, 100, 101), and in that the separating piston (66, 106) forms a control piston for the 2/2-way valve (77, 119), and said 2/2-way valve includes a valve seat (79, 120) and a closing body (82, 124).

5. A vehicle hydraulic brake system according to claim 3, in which the separating piston (106) has a first piston sealing ring (110) on an end juxtaposed primary space (104) and, at an end directed towards the secondary space (105), a second piston sealing ring (111), and in that the separating piston (106) has a neck (112) of reduced diameter in a region between said first and second piston sealing rings (110, 111), in that the neck (112) has a dimension in a longitudinal direction of the separating piston (106) which is at least as long as a longest possible stroke envisaged for the separating piston (106), and in that the cylinder (100, 101) has a relief opening (113) associated with the neck (112), which relief opening (113) communicates with the neck (112) of the separating piston (106) in all possible positions of the latter.

6. A vehicle hydraulic brake system according to claim 2, in which the valve means comprises a throttle valve (52) through which the outlet (55) of the auxiliary pump (49) is connected to the inlet (53) of said auxiliary pump.

7. A vehicle hydraulic brake system according to claim 6, in which the 2/2-way valve (77, 119) is accommodated in a cylinder (37, 38, 100, 101), and in that the separating piston (66, 106) forms a control piston for the 2/2-way valve (77, 119), and said 2/2-way valve includes a valve seat (79, 120) and a closing body (82, 124).

8. A vehicle hydraulic brake system according to claim 6, in which the separating piston (106) has a first piston sealing ring (110) on an end juxtaposed primary space (104) and, at an end directed towards the secondary space (105), a second piston sealing ring (111), and in that the separating piston (106) has a neck (112) of reduced diameter in a region between said first and second piston sealing rings (110, 111), in that the neck (112) has a dimension in a longitudinal direction of the separating piston (106) which is at least as long as a longest possible stroke envisaged for the separating piston (106), and in that the cylinder (100, 101) has a relief opening (113) associated with the neck (112), which relief opening (113) communicates with the neck (112) of the separating piston (106) in all possible positions of the latter.

9. A vehicle hydraulic brake system according to claim 2, in which the 2/2-way valve (77, 119) is accommodated in a cylinder (37, 38, 100, 101), and in that the separating piston (66, 106) forms a control piston for the 2/2-way valve (77, 119), and said 2/2-way valve includes a valve seat (79, 120) and a closing body (82, 124).

10. A vehicle hydraulic brake system according to claim 2, in which the separating piston (106) has a first piston sealing ring (110) on an end juxtaposed primary space (104) and, at an end directed towards the secondary space (105), a second piston sealing ring (111), and in that the separating piston (106) has a neck (112) of reduced diameter in a region between said first and second piston sealing rings (110, 111), in that the neck (112) has a dimension in a longitudinal direction of the separating piston (106) which is at least as long as a longest possible stroke envisaged for the separating piston (106), and in that the cylinder (100, 101) has a relief opening (113) associated with the neck (112), which relief opening (113) communicates with the neck (112) of the separating piston (106) in all possible positions of the latter.

11. A vehicle hydraulic brake system according to claim 2, in which the separating piston (66) has a valve chamber (78) with a valve seat (79) adjacent to the secondary space (68), in that starting from the valve seat (79) a connection passage (80, 81) leads to a neck (72) of reduced diameter arranged on the separating piston (66) between first and second piston sealing rings (70, 71), which neck (72) communicates with a connection (62) in the main brake cylinder, in that a closing element (82), which is loaded by a closing spring (88), is displaced in the valve chamber (78) relative to the separating piston (66), in that the closing element (82) is connected to a valve stem (83), the valve stem (83) has a collar (84) opposite to the closing element (82), which collar (84) is in contact with one another valve seat (76) and the valve stem (83) holds the closing element (82) at a distance from the valve seat (79).

12. A vehicle hydraulic brake system according to claim 11, in which the second piston sealing ring (71) is located between the neck (72) and the secondary space (68) and is configured as a lip sealing ring around which flow can occur towards the secondary space (68) in a manner of a non-return valve element.

13. A vehicle hydraulic brake system according to claim 2, in which a floating piston (107), which is adjacent to the secondary space (105) and has two floating piston sealing rings (115, 116) arranged at a distance apart, is arranged so that said floating piston can be displaced, said floating piston (107) separates an actuation space (108) located towards the main brake cylinder (3) from the secondary space (105), in that a floating piston return spring (129) acts on the floating piston (107) in a sense of reducing the actuation space (108), in that the actuation space (108) communicates with the main brake cylinder (3) the generate brake pressure in the secondary space (105), in that the floating piston (107) has neck (117) of reduced diameter between the piston sealing rings (115, 116), which neck (117) with said reservoir (4) for pressure medium via a supply opening (118) on a periphery of the cylinder (100, 101), and in that the 2/2-way valve (119) is arranged in the floating piston (107) in its longitudinal axis, a valve seat (120) is rigidly arranged relative the floating piston (107), a connecting passage (122, 123) extends between the valve seat (120) and the neck (117) and the closing spring (128) acts on a closing element (124) by means of a valve stem (115) which is bound within a spring chamber (114) located in the separating piston (106).

14. A vehicle hydraulic brake system according to claim 1, in which the separating piston (66, 106) forms a control piston for the 2/2-way valve (77, 119), and said 2/2-way valve includes a valve seat (79, 120) and a closing body (82, 124).

15. A vehicle hydraulic brake system according to claim 14, in which the separating piston (106) has a first piston sealing ring (110) on an end juxtaposed primary space (104) and, at an end directed towards the secondary space (105), a second piston sealing ring (111), and in that the separating piston (106) has a neck (112) of reduced diameter in a region between said first and second piston sealing rings (110, 111), in that the neck (112) has a dimension in a longitudinal direction of the separating piston (106) which is at least as long as a longest possible stroke envisaged for the separating piston (106), and in that the cylinder (100, 101) has a relief opening (113) associated with the neck (112), which relief opening (113) communicates with the neck (112) of the separating piston (106) in all possible positions of the latter.

16. A vehicle hydraulic brake system according to claim 1, in which the separating piston (106) has a first piston sealing ring (110) on an end juxtaposed primary space (104) and, at an end directed towards the secondary space (105), a second piston sealing ring (111), and in that the separating piston (106) has a neck (112) of reduced diameter in a region between said first and second piston sealing rings (110, 111), in that the neck (112) has a dimension in a longitudinal direction of the separating piston (106) which is at least as long as a longest possible stroke envisaged for the separating piston (106), and in that the cylinder (100, 101) has a relief opening (113) associated with the neck (112), which relief opening (113) communicates with the neck (112) of the separating piston (106) in all possible positions of the latter.

17. A vehicle hydraulic brake system according to claim 16, in which the relief opening (113) communicates by means of a conduit (130) with the reservoir (4) which is arranged at a higher level.

18. A vehicle hydraulic brake system according to claim 1, in which a floating piston (107), which is adjacent to the secondary space (105) and has two floating piston sealing rings (115, 116) arranged at a distance apart, is arranged so that said floating piston can be displaced, said floating piston (107) separates an actuation space (108) located towards the main brake cylinder (3) from the secondary space (105), in that a floating piston return spring (129) acts on the floating piston (107) in a sense of reducing the actuation space (108), in that the actuation space (108) communicates with the main brake cylinder (3) to generate brake pressure in the secondary space (105), in that the floating piston (107) has a neck (117) of reduced diameter between the piston sealing rings (115, 116), which neck (117) communicates with said reservoir (4) for pressure medium via a supply opening (118) on a periphery of the cylinder (100, 101), and in that the 2/2-way valve (119) is arranged in the floating piston (107) in its longitudinal axis, a valve seat (120) is rigidly arranged relative the floating piston (107), a connecting passage (122, 123) extends between the valve seat (120) and the neck (117) and the closing spring (128) acts on a closing element (124) by means of a valve stem (115) which is bound within a spring chamber (114) located in the separating piston (106).

19. A vehicle hydraulic brake system according to claim 1, in which for automatic braking operation, the control unit (30) is arranged in such a way that it opens at least one second 2/2-way valve (45, 46) located between the additional device (12) and a respective inlet (89, 90) of the feed-back pump (13, 14) only when automatic brake pressure increases are necessary.

20. A vehicle hydraulic brake system according to claim 1, in which for automatic braking operation, the control unit (30) is arranged in such a way that it only switches on the auxiliary pump (49) during intervals in which an automatic increase in brake pressure is necessary in at least one brake circuit.

* * * * *

UNITED STATES PATENT AND TRADEMARK OFFICE
CERTIFICATE OF CORRECTION

PATENT NO. : 5,501,514
DATED : March 26, 1996
INVENTOR(S) : Reinhard Resch et al It is certified that error appears in the above-identified patent and that said Letters Patent is hereby corrected as shown below:    On title page,
 Item
 [75] Inventors:

Change Regina Schroff-Lauer to

--Regina Schropp-Lauer--.

Signed and Sealed this

Tenth Day of September, 1996

Attest:

BRUCE LEHMAN

*Attesting Officer*    Commissioner of Patents and Trademarks